United States Patent Office 2,853,621
Patented Sept. 23, 1958

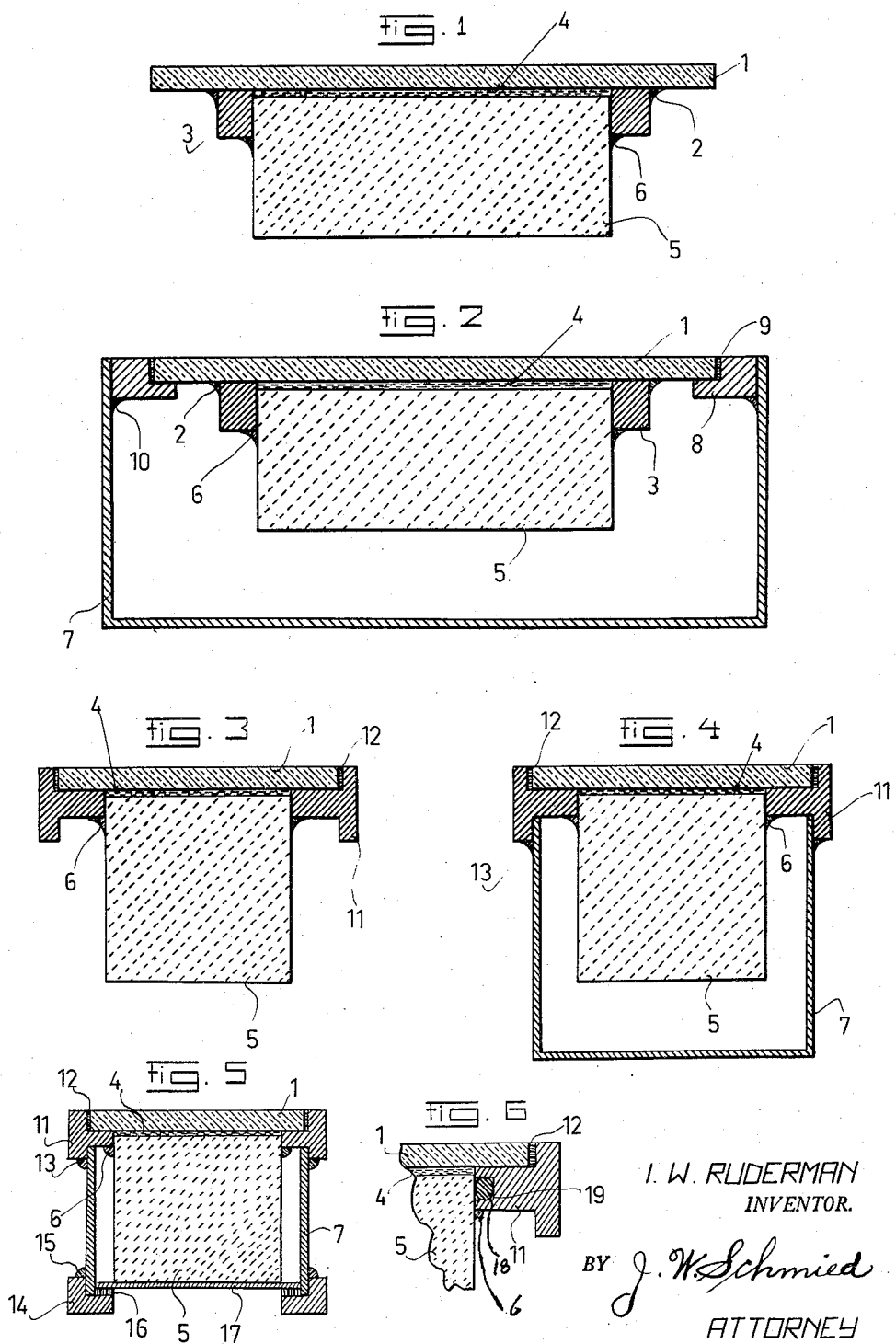

2,853,621

MOUNTING OF FLUORESCENT AND PHOSPHORESCENT ELEMENTS

Irving W. Ruderman, New York, N. Y., assignor to Isomet Corporation, Palisades Park, N. J., a corporation of New Jersey Application July 16, 1953, Serial No. 368,472

12 Claims. (Cl. 250—71)

This invention relates to mounted fluorescent or phosphorescent bodies, more particularly crystals, which respond to various kinds of radiated waves or particles by fluorescing or phosphorescing and giving off detectable radiant energy, and to mountings therefor and methods of mounting, and even more particularly to those of such bodies which need protection from the atmosphere, because they are hygroscopic, or for other reasons.

It is common in the art to mount such bodies so that they respond to alpha, beta, gamma, or other radiation by emitting light which passes through a coupling window of optical glass to activate the sensitive photo-cathode element of a photo-multiplier tube of known type.

Commonly used mountings for such crystals have previously been as follows: A thin-walled open ended aluminum can is provided as a container; the crystal has been cemented directly to the inner side of an optical glass cover which is then inverted and sealed by cement to the can with the crystal inside; the cements used to seal the crystal to the lid have been the best available, such as "Biggs R313," "Araldite 101," for excellence of optical properties as a crystal to glass coupling element but have suffered from the disadvantage of an uncertain lifetime. The coupling element has served to transmit light to a photo-electrically controlled secondary electron emission or other tube.

Before inserting and sealing, the crystal has often been painted with paint consisting of $TiO_2$, in a suitable vehicle, and baked; also in addition or alternatively, the space in the can around the crystal may be filled with MgO in powdered form. These details need not be changed in the use of the new method and equipment about to be described.

Devices such as described have had reasonably good properties, but often suffered from a short life, because the seal between the crystal and the window tended to loosen; this has been caused by one or more of, vibration, changes in the adhesive properties of the cement with time—possibly as the result of a continuing polymerization of the cement after sealing, or by differences in the temperature coefficient of expansion of the crystal, the glass, and the cement, or by differences between any two of them, or by other causes. Often times areas of separation occurred and then if the can received a sharp blow, total separation would occur. Areas of partial separation impair the light transmission and create additional reflections.

In accordance with the present invention the crystal has a layer of viscous or semi-viscous light transmitting cementing substance between itself and the optical window, and is firmly held by a metallic (aluminum) ring into which it is cemented and which in turn is cemented to the glass window, which in turn is cemented to a retaining ring cemented in the top of the can. The cemented substance between the crystal and the window is tightly enclosed, does not dry out, and furnishes an optical coupling which has a high degree of permanence. This construction has been found to solve the problem. If the radiation which impinges on the crystal is to enter through the walls of the can the whole or the entirety of such parts of the walls are to be light metal, i. e. magnesium or aluminum or metal or alloy having similar properties and of thickness appropriate to the metal penetrating power of the radiation to be detected.

Reference is made to the accompanying drawings in which—

Fig. 1 shows a crystal cemented to the optical window as prepared for mounting in the can; and Fig. 2 shows the completed device;

Fig. 3 shows a modified structure consisting of the crystal cemented to the aluminum ring which in turn is cemented to the optical coupling window;

Fig. 4 shows the crystal as per Fig. 3, mounted in the can;

Fig. 5 shows a modified form adapted for uses wherein low energy radiation is to be detected and indicated; and Fig. 6 shows a fragmentary view of a corner of a device such as that of Fig. 4 or Fig. 5 modified to use a tightly fitting rubber ring to seal the optical coupling fluid into place.

With reference to Fig. 1 the optical window 1 has cemented to it by cement 2 an aluminum mounting ring 3. The cement 2 as well as cement bodies 6, 9 and 10, hereinafter referred to, may consist of a suitable cement, specifically, by way of example, of an "Epon" base resin sold under the trade name "Biggs R313 Cement Bonding Agent" by the Carl H. Biggs Company of California, U. S. A. Any equivalent firmly hardening and good adhering cement, especially one which will not react with and absorb or be absorbed into silicone fluids, may serve the purpose.

The optical coupling window 1 may consist of fused quartz, "Lustraglass" the trade name for a glass manufactured by the American Window Glass Co., Pittsburgh, Pennsylvania, "Vycor" the trade name for a 96% silica glass manufactured by Corning Glass Works, Corning, New York, or any other glass highly transparent to the light emitted by the particular crystal being mounted, or a glass substitute such as polymethyl methacrylate.

The crystal 5 is optically coupled and to a degree physically attached to the glass window 1 by an air excluding, transparent, colorless, inert, semi-solid but mobile, silicone type, liquid which remains in a limited viscosity range over the working temperatures to which such a device is exposed in use. The glass window is or may be coupled to a suitable photo-multiplier tube. Only high viscosity silicones which nevertheless remain mobile are suitable for the purpose. The fluid employed is stable, readily wets clean dry glass and crystals such as alkali-halides activated with heavy metals, and is desirably free from solvent effect upon or solution in or reaction with the cement employed. It is also non-reactive with the scintillating crystal or other phosphor 5. The viscosity may range up to $10^6$ centistokes at 25° C. and should remain high at increased temperatures such as up to 100° C. The exact minimum viscosity for effective operation may depend on conditions but should always remain high. Devices of this kind may be and often are subjected to a wide range of temperatures, e. g., minus 50° C. to plus 150° C.

The thermal expansion coefficient is a desirable one for the purpose, being in the neighborhood of 0.850 to $0.900 \times 10^{-3}$ per degree centigrade in the range 10° to 100° C. Important is the refractive index which is in the range of about 1.4033 to 1.4040 or above for materials of the viscosity range employed. The importance of this lies in the fact of its effectiveness in coupling the crystal to glass or its equivalent for light transmission. Light or other radiation in and adjacent to the spectral range is transmitted most effectively through adjacent surfaces of bodies having the same or not too different refractive indices. A durable and effective mounting and coupling for the crystal is thus presented.

The crystal 5 typifies a suitable phosphor and as specifically disclosed consists of a scintillating crystal which fits firmly and tightly in the ring 3 and is cemented all the way around with a toroidal ring 6 of cement of approximately triangular cross section. Before cementing any excess silicone is carefully wiped away from the junction of ring 3 and crystal 5.

The ring, window, and plate are now ready for mounting in can 7, which operation is commonly performed in an exceedingly dry atmosphere. The can is provided with a retaining ring 8 which may be soldered, welded or cemented in any suitable manner to the can, and has a cross section as shown.

The glass window is set into the retaining ring 8, which may consist of aluminum or other suitable metal, with a cement ring 9 which fits under the edge of the window as well as around the periphery thereof.

In a specific embodiment the ring 8 may be cemented into the can 7 by cement 10, this being done, of course, before applying the assembly of Fig. 1 to the can.

The crystal 5 may consist of any phosphorescent or fluorescent body suitable for the purpose. Among those commonly used are alkali-halides activated with a small percentage of a heavy metal. Any of lithium iodide, caesium iodide, or specifically sodium iodide activated with thallium or tin are examples; others may be used.

All of the twenty possible alkali-halides are described in the literature as being phosphors of various degrees of effectiveness for various purposes, the wave length of the desired spectral light emitted may vary; several activators have been employed with these, and other crystalline phosphors are known, the particular one used is a coincidental feature of this disclosure; organic scintillating phosphors of several kinds have been employed. Moreover the crystal 5 may be replaced for some purposes with any one of a number of powdered phosphors consolidated with a binder. However, the phosphor employed and the cements in contact therewith and more particularly the silicone layer 4 must be such as do not detrimentally affect one another. Aside from this, practically any phosphor may be used, but the ivention has special applicability to scintillating inorganic single crystals of the type outlined above, because the cements used and the silicones employed are especially suitable for use with phosphors of the activated alkali-halide class.

The surface of the crystal exposed inside the can may be coated with light reflecting material, e. g. TiO$_2$, or the interior of the can may be silvered, or the otherwise vacant space filled with powdered MgO, or any of these things may be done.

For the purposes of this specification the crystal, the can and the rings 3 and 8 and the glass window 1 need not be round, but may be any desired shape such as an ellipse, square, or other polygon and the use of the word "ring," "member," "annular," "plate" and/or "can" in reference thereto is intended to include all such variations. Moreover, square crystals may be mounted in cylindrical cans, or vice versa, etc. The radiation to cause light production enters through the walls of the can 7 to affect the crystal, but it is within the scope of the invention to provide an air tight entrance window in the bottom or side of the can for influx of ultra-violet or other less penetrating radiation if one wished to cause the crystal to scintillate under the control of such less penetrating radiation.

In Fig. 3 glass window 1 is cemented to ring 11 by cement 12 and crystal 5 is coupled to the window 1 by a bubble free and air free silicone of the kind described, supra. The ring 11 is essentially two integral rings. One of these is the inner flange of the ring 11. Cement 6 affixes the crystal to the ring 11 and seals in the silicone.

The assembly of Fig. 3 is then mounted in the can 7 as shown in Fig. 4, and ring 11 cemented to the can by cement 13. This is done in a moisture free atmosphere as previously described. Because the layer 4 has no cementing function it may consist of such substance or substances, as described, which will most effectively perform its radiation coupling functions. The cements 2, 6, and 9 not only firmly hold the crystal so that vibration, blows, and extreme temperature changes do not cause separation but they imprison the liquid silicone so that it remains in contact with the glass window 1 and the crystal 5 without formation of bubbles or other areas of separation. The silicone layer cannot escape. The glass window is often sealed to or otherwise presented to the optical window or radiant energy sensitive cathode of an electron tube; the combinations thus produced are often used in mines, on mountain tops, down oil wells, etc., so that the desired permanence of the structure as well as its effectivness in detecting and indicating radiation are both achieved in the arrangement described.

Fig. 5 shows a modification adapted for use in detecting radiation of low penetrating power. In such cases the crystal must be protected from moisture, deleterious fluids, gases, etc., but must be accessible to the radiation of low penetrating power such as heavy ionizing particles like protons and low energy beta and gamma rays of energy less than approximately 200 k. e. v. For this purpose a metal foil 17 preferably of polished aluminum or similar light metal is provided; this is preferably a foil having a thickness as low as 0.002 mm. but in any case not over about 0.6 mm. This foil furnishes a window for access of the low penetrating power radiation and also acts to reflect the spectral radiation emitted by the crystal in the direction of the glass window so that this radiation may be effectively collected by the photo multiplier tube. Such a foil is extremely liable to injury merely from setting the instrument down on an irregular surface which is perhaps the smallest of the various hazards to which it may be subjected. In order to prevent injury from such causes the foil is placed in direct contact with the crystal, the dimensions of the crystal, can, and other elements being chosen so as to accomplish this purpose. The aluminum ring 14 is cemented to the cylinder 7 by cement 15 and the foil 17 cemented to the ring 14 by cement 16; these operations being performed in such order as convenient and by the aid of a jig, if needed. The crystal which has already been prepared as per Fig. 3 is then inserted and fastened in place by cementing the ring 11 with cement 13. Obviously now the foil 17 is protected against accidental damage by collision with other objects such as fingers or tools and may, in fact, sustain quite a sharp blow without injury.

Fig. 6 shows a modification which may be used in the case of either Fig. 4 or Fig. 5. The ring 11 is provided with an annnular groove 18. The crystal is pressed into place against a tightly fitting ring 19 of neoprene, a form of artificial rubber, which does not react with the crystal or with silicone. This tends to better confine the silicone and to hold the crystal in place although cement 13 may also be used.

It is to be noted that the crystal and the transparent window must be chosen for other essential properties rather than for any match between their coefficients of expansion; with the constructions disclosed they are free to expand or contract relative to one another without causing trouble whereas with prior art devices wherein the crystal was cemented to the glass partial or total separation occurred after a short time to the dissatisfaction of the user who found himself with an expensive but defective device. One notes that crystals of this type are quite difficult and expensive to manufacture so that a device of the type illustrated, although structurally simple, is disproportionately expensive, for which reason durability in use is extremely desirable. The structures illustrated have achieved a noteworthy increase in life and continued effectiveness as compared with prior constructions used for similar purposes.

What is claimed is:

1. A coupling for a phosphor consisting of a transparent crystal with a vitreous transparent window consisting of a silicone fluid between the crystal and the window and means for preventing the fluid from flowing out from between the window and the crystal, a container surrounding the crystal and forming with the window an air tight casing for the crystal.

2. A coupling according to claim 1, wherein the crystal is coupled to the container by a tightly fitting sealing ring composed of a rubber-like elastomer.

3. A phosphor coupled optically to a glass sheet with exclusion of any gas including exclusion of air and exclusion of moisture by a glass wetting substance which is a transparent, colorless, inert, high viscosity liquid between zero degrees C. and 100° C. and having a refractive index higher than 1.403 but less than the glass, the phosphor being in direct and intimate contact with the substance, the glass sheet being in direct and intimate contact with the substance, and the substance being sealed and held in such intimate relationships by separate sealing and retaining means.

4. In a combination according to claim 3, a mounting member for the phosphor, a groove in said member and said sealing and retaining means including an elastomeric ring tightly fitting said groove and said phosphor.

5. A crystalline phosphor coupled optically to a glass sheet, with exclusion of any gas including exclusion of air and exclusion of moisture, by a substance which is glass wetting, transparent, colorless and chemically inert to glass and to the phosphor and maintains indefinitely a high viscosity at all temperatures between zero degrees C. and 100 degrees C. and has a refractive index higher than 1.403 but less than the glass, the moisture and air being excluded by a sealing ring surrounding the junction of phosphor and glass.

6. A phosphor comprising a transparent crystal coupled to a sheet of material freely transmissive of radiant energy in the infra-red to ultra-violet range, inclusive, by a silicone having essentially permanent cold flow mobility as distinguished from a cement-like substance drying to a hard varnish-like consistency, the edges of the junction between the phosphor and the sheet being sealed by a retaining ring and a cement having a constitution non-reactive with the silicone.

7. A phosphor comprising a transparent crystal coupled to a glass-like body, inclusive of glass, having good transparency for spectral wave lengths by a substance having definite cold flow characteristics, but whose viscosity over an indefinite period of time remains constant and is not less than $10^3$ but may extend to $10^6$ centistokes at 25° C. to 100° C.

8. A phosphor comprising a transparent crystal coupled to a glass-like body, inclusive of glass, having good transparency for spectral wave lengths by a transparent substance having definite cold flow characteristics but whose viscosity remains constant over an indefinite period of time and is not less than $10^3$ but may extend to $10^6$ centistokes at 25° C. to 100° C., the phosphor, the substance, and the glass being in successive intimate contact, a ring of metal surrounding the material, a ring of cement binding the phosphor to the ring, and a ring of cement binding the body to the ring.

9. A phosphor consisting of a transparent crystal of the type subject to impairment by exposure to moisture or air such as by its hygroscopicity or deliquescence mounted in a sealed moisture-proof vessel and coupled to a window for the transmission of radiant spectral energy therethrough by a layer of mobile silicone to the exclusion of appreciable air, gas, or voids, in which the silicone has the essentially permanent mobility characteristic of cold flow and a viscosity in excess of $10^3$ centistokes at 25° C. to 100° C., a metal ring completely surrounding the silicone, cement completely surrounding the junction of the phosphor to the ring, and cement completely enclosing the junction of the window and the ring with respect to the edges of the layer of silicone.

10. As an element of a nuclear radiant energy detection device, a toroidal ring, a transparent crystalline scintillating phosphor body partially fitting into said ring, a sheet of material having the permanency and light transmitting properties of glass fitted to said ring and cemented thereto, a layer of transparent viscous silicone occupying the entire space between said phosphor and said sheet, the cement holding the phospor to the ring and the ring to the sheet and coadjuvantly with the phosphor, the sheet and the ring, completely closing the silicone off from outside access.

11. A metallic casing of thickness and composition appropriate for the passage thereinto of nuclear radiation, an annular ring fixedly attached thereto, a window having good transmission properties for light energy in and around the visible spectrum having an annular edge sealed to said ring, a second annular ring cementedly sealed to said window on the surface thereof which is interior to said casing, a phosphor partially fitting within and cementedly sealed to said second ring to delineate a thin space between said phosphor and window, and silicone fluid filling the thin space, the cement between the phosphor and the second ring and the cement between the window and the second ring serving to completely seal off the space occupied by the silicone, and wherein the casing, the first ring, the window, and the seal between them completely seals the phosphor into the casing in an air-tight manner.

12. A combination according to claim 11 wherein the face of the casing opposite the window consists of a light metal foil of extreme thinness lying in immediate contact with the phosphor for support thereby over a large part of its area, the foil being cemented to a metallic ring which in turn is cemented to the main body of the casing.

References Cited in the file of this patent

UNITED STATES PATENTS

| | | |
|---|---|---|
| 2,650,310 | White | Aug. 25, 1953 |
| 2,659,789 | Lang | Nov. 17, 1953 |
| 2,689,308 | Land | Sept. 14, 1954 |
| 2,711,482 | Goodman | June 21, 1955 |
| 2,721,274 | Garbellano et al. | Oct. 18, 1955 |
| 2,727,154 | Goldsworthy | Dec. 13, 1955 |

OTHER REFERENCES

Optical Cement for Scintillation Use, by R. L. Shipp, from Review of Scientific Instruments, vol. 23, No. 12, December 1952.